US012515989B2

(12) United States Patent
Sinnige et al.

(10) Patent No.: US 12,515,989 B2
(45) Date of Patent: Jan. 6, 2026

(54) WAX DISPERSION COMPOSITION CONTAINING LIGNIN FOR IMPARTING WATER RESISTANCE TO GYPSUM

(71) Applicant: Walker Industries Holdings Limited, Thorold (CA)

(72) Inventors: Laurence Anthony Sinnige, Burlington (CA); Niels Mathieu Barbara Smeets, Courtice (CA); Rebecca Katie Hum, Guelph (CA)

(73) Assignee: Walker Industries Holdings Limited, Thorold (CA)

( * ) Notice: Subject to any disclaimer, the term of this patent is extended or adjusted under 35 U.S.C. 154(b) by 252 days.

(21) Appl. No.: 18/142,163

(22) Filed: May 2, 2023

(65) Prior Publication Data

US 2023/0265016 A1 Aug. 24, 2023

Related U.S. Application Data

(63) Continuation-in-part of application No. 17/003,318, filed on Aug. 26, 2020, now Pat. No. 11,752,660.

(60) Provisional application No. 62/891,519, filed on Aug. 26, 2019.

(51) Int. Cl.
| | | |
|---|---|---|
| *C04B 103/65* | (2006.01) | |
| *C04B 22/06* | (2006.01) | |
| *C04B 24/08* | (2006.01) | |
| *C04B 24/34* | (2006.01) | |
| *C04B 24/38* | (2006.01) | |
| *C04B 28/14* | (2006.01) | |
| *C04B 40/00* | (2006.01) | |
| *C09D 191/06* | (2006.01) | |
| *C09D 197/00* | (2006.01) | |
| *C04B 111/00* | (2006.01) | |

(52) U.S. Cl.
CPC ............ *C04B 24/38* (2013.01); *C04B 22/062* (2013.01); *C04B 24/08* (2013.01); *C04B 24/34* (2013.01); *C04B 28/14* (2013.01); *C04B 40/0039* (2013.01); *C09D 191/06* (2013.01); *C09D 197/005* (2013.01); *C04B 2103/65* (2013.01); *C04B 2111/0062* (2013.01)

(58) Field of Classification Search
CPC ........ B27N 1/006; B27N 1/02; B27N 1/0209; B27N 3/002; B27N 3/02; B27N 3/04; C04B 24/08; C04B 24/16; C04B 24/18; C04B 24/34; C04B 24/38; C04B 28/14; C04B 2103/65; C04B 2111/27; C08L 91/06; C08L 91/08; C08L 97/005; C08L 97/02; C09D 5/022; C09D 191/06; C09D 191/08; C09D 197/005; C09D 197/02
See application file for complete search history.

(56) References Cited

U.S. PATENT DOCUMENTS

| | | |
|---|---|---|
| 2,349,326 A | 5/1944 | Wilson |
| 2,464,828 A | 3/1949 | Pollak et al. |
| 4,431,826 A | 2/1984 | Sweeney |
| 4,740,591 A | 4/1988 | Dilling et al. |
| 5,968,237 A | 10/1999 | Sinnige |
| 7,842,731 B2 | 11/2010 | Eckert et al. |
| 8,821,632 B2 | 9/2014 | Stuart et al. |
| 9,045,370 B2 | 6/2015 | Stuart et al. |
| 9,091,023 B2 | 7/2015 | Kousini et al. |
| 9,670,097 B2 | 6/2017 | Ayambem et al. |
| 2010/0116406 A1 | 5/2010 | Mahoney et al. |
| 2012/0247617 A1 | 10/2012 | Berlin et al. |
| 2013/0004279 A1 | 1/2013 | Naito et al. |
| 2013/0213550 A1 | 8/2013 | Berlin |
| 2015/0322104 A1 | 11/2015 | Tikka |
| 2019/0382582 A1 | 12/2019 | Paris et al. |
| 2021/0060814 A1* | 3/2021 | Smeets ................ C08L 97/005 |

FOREIGN PATENT DOCUMENTS

| | | |
|---|---|---|
| WO | 1992/018557 | 10/1992 |
| WO | 2002098816 A1 | 12/2002 |
| WO | 2010053494 A1 | 5/2010 |
| WO | 2013188975 A1 | 12/2013 |
| WO | 2014116150 A1 | 7/2014 |
| WO | 2018102378 A1 | 6/2018 |
| WO | 2019068180 A1 | 4/2019 |

OTHER PUBLICATIONS

Hu, Z., et al. "Structural Characterization of Pine Kraft Lignin: BioChoice Lignin vs Indulin AT", Journal of Wood Chemistry and Technology, 2016, pp. 432-446, 36(6).

Alwadani et al. "Synthetic and Lignin-based Surfactants: Challenges and Opportunities." Carbon Resources Conversion 1, Accepted Jul. 16, 2018 and available online Jul. 17, 2018. pp. 126-138.

Rayer et al. "Dissociation Constants (pKa) of Tertiary and Cyclic Amines: Structural and Temperature Dependences." Journal of Chemical and Engineering Data 59 (11): dx.doi.org/10.1021/je500680q. Accepted Oct. 7, 2014 and Published Oct. 20, 2014. pp. 3805-3813.

Rojas et al. "Lignins as Emulsion Stabilizers." Chapter 12 of Materials, Chemicals and Energy, from Forest Biomass ACS Symp. Series, 958. Apr. 16, 2007. pp. 182-199.

Ragnar et al. Appendix on the poster "On the Dissociation Constants of Phenolic Groups in Lignin Structures" presented at the 10th International Symposium on Wood and Pulping Chemistry (ISWPC), Yokohama, Japan, Jun. 7-10, 1999. 2 pages.

Tolosa et al. "Effect of Fenton's Reagent on O/W Emulsions Stabilized by Black Liquor." Journal of Colloid and Interface Science 294 (1): https://doi.org/10.1016/j.jcis.2005.06.092. Accepted Jun. 29, 2005 and available online Aug. 2, 2005. pp. 182-186.

(Continued)

*Primary Examiner* — Michael A Tolin
(74) *Attorney, Agent, or Firm* — Scully, Scott, Murphy & Presser, P.C.

(57) ABSTRACT

Aqueous water repellency dispersions for use in the manufacture of gypsum wallboard, comprising a wax phase including a wax and a functionalized wax, an aqueous phase including a Kraft lignin and a water soluble base in an amount sufficient to solubilize the Kraft lignin.

18 Claims, No Drawings

(56) References Cited

OTHER PUBLICATIONS

Yuliestyan, et al. "Assessment of Modified Lignin Cationic Emulsifier for Bitumen Emulsions used in Road Paving." Materials and Design 131: https://doi.org/10.1016/j.matdes.2017.06.024. Accepted Jun. 11, 2017 and available online Jun. 13, 2017. pp. 242-251.

Yuliestyan, et al. "Sustainable Asphalt Mixes Manufactured with reclaimed Asphalt and Modified-lignin-stabilized Bitumen Emulsions." Construction and Building Materials, 173: https://doi.org/10.1016/j.conbuildmat.2018.04.044. Accepted Apr. 5, 2018 and available online Apr. 24, 2018. pp. 662-671.

He et al. "Preparation of Sulfomethylated Softwood Kraft Lignin as a Dispersant for Cement Admixture." RSC Advances, 5(58): https://doi.org/10.1039/c5ra04526f. May 8, 2015. pp. 47031-47039.

He et al. "Sulfomethylated Kraft Lignin as a Flocculant for Cationic Dye." Colloids and Surfaces A: Physicochemical and Engineering Aspects, 503: https://doi.org/10.1016/j.colsurfa.2016.05.009. Accepted May 3, 2016 and available online May 4, 2016. pp. 19-27.

Li et al. "Carboxymethylated Lignins with Low Surface Tension toward Low Viscosity and highly Stable Emulsions of crude Bitumen and Refined oils." Journal of Colloid and Interface Science, 482: https://doi.org/10.1016/j.cis.2016.07.063. Accepted Jul. 25, 2016 and available online Jul. 26, 2016. pp. 27-38.

Gupta et al. "Polymer-Grafted Lignin Surfactants Prepared via Reversible Addition-Fragmentation Chain-Transfer Polymerization." Langmuir, 30(31): https://doi.org/10.1021/la501696y. Jul. 21, 2014. pp. 9303-9312.

Qian et al. "CO2-responsive Diethylaminoethyl-modified Lignin Nanoparticles and their Application as Surfactants for CO2/N2-switchable Pickering Emulsions." Green Chemistry, 16(12): https://doi.org/10.1039/c4gc01242a. Aug. 13, 2014. pp. 4963-4968.

Schmidt et al. "Lignin-based Polymeric Surfactants for Emulsion Polymerization." Polymer, 112(4): https://doi.org/10.1016/j.polymer.2017.02.036. Accepted Feb. 8, 2017. 32 pages.

Ragnar et al. "pKa-Values of Guaiacyl and Syringyl Phenolsrelated to Lignin." Journal of Wood Chemistry and Technology, 20(3), Published in 2000. pp. 277-305.

U.S. Non-Final Office Action dated Nov. 28, 2022 issued in parent case, U.S. Appl. No. 17/003,318.

\* cited by examiner

WAX DISPERSION COMPOSITION CONTAINING LIGNIN FOR IMPARTING WATER RESISTANCE TO GYPSUM

CROSS REFERENCE TO RELATED APPLICATIONS

The present application is a Continuation-In-Part application of U.S. patent application Ser. No. 17/003,318 filed on Aug. 26, 2020, now U.S. Pat. No. 11,752,660, which claims priority under the Paris Convention to U.S. Application No. 62/891,519, filed on Aug. 26, 2019. The content of such prior applications is incorporated herein by reference as if set forth in its entirety.

FIELD

The present invention relates to an aqueous water repellency dispersion for use in the manufacture of gypsum wallboards and methods of formulating the dispersion. More specifically, the invention relates to an aqueous water repellency dispersion comprising (a) hydrocarbon wax, (b) oxidized hydrocarbon wax, and (c) purified lignin.

BACKGROUND

Gypsum products such as wallboard panels contain a hardened gypsum core contained between two paper liners that form the outside surfaces of the wallboard. The gypsum core is produced from a slurry of calcium sulphate hemihydrate ($CaSO_4 \cdot 0.5H_2O$) in water, which is allowed to hydrate (or set) to the much harder calcium sulphate dihydrate ($CaSO_4 \cdot 2H_2O$). Excess water is removed through drying, forming the hygroscopic calcium sulphate anhydrite ($CaSO_4$). Water absorption reverses the hydration state of the gypsum, leading to weakening of the wallboard. Therefore, additives such as asphalt, wax or siloxanes have been incorporated into the gypsum wallboard to produce a water-resistant product.

Hydrocarbon waxes do not disperse well within an aqueous gypsum slurry and are therefore added in the form of an aqueous wax dispersion. Typically, the hydrocarbon wax is emulsified using a combination of an anionic low molecular weight dispersant and a non-ionic stabilizer. There are a number of examples of this in the prior art, for example US Patent 20100116406A1 by Mahoney and Burns teaches the use of a lignosulfonate dispersant and a polyvinyl alcohol stabilizer. Similarly, U.S. Pat. No. 5,968,237A by Sinnige; 9,045,370 B2 by Stuart, Lyons, and Perera; and 9,670,097 B2 by Ayambem, Gonzalez, and Sproul teach the combined use of a lignosulfonate, or other dispersant, in combination with a polyvinyl alcohol stabilizer.

The incorporation of polyvinyl alcohol into the wax dispersion has benefits that extend beyond stabilizing and dispersing the hydrocarbon wax in the gypsum slurry. Polyvinyl alcohol is added to the gypsum slurry to increase the mechanical strength of the wallboard. The polyvinyl alcohol coats the gypsum crystals/particles such that, during the setting of the wallboard, the coated gypsum particles are prevented from returning to the hemihydrate state from the dihydrate. This has been demonstrated to improve the water resistance of the gypsum wallboard. The prior art further teaches that polyvinyl alcohol derivatives such as polyvinyl acetate-vinyl alcohol copolymer (WO2013/188975 by Sinnige, Racota, Cocquyt, and Haerens) and ethylene-vinyl alcohol-vinyl acetate tertpolymer (U.S. Pat. No. 9,670,097 B2 by Ayambem, Gonzalez, and Sproul) can further improve upon this principle. However, the use of polyvinyl alcohol, or structurally similar stabilizers, in gypsum slurry has the undesired side effect of increasing viscosity of the gypsum slurry and lowering the fluidity.

The fluidity of a gypsum slurry is carefully managed during the production of gypsum wallboard. The presence of polyvinyl alcohol or structurally similar stabilizers in gypsum slurry decreases the fluidity of the slurry to the extent where production problems arise such as (1) difficulty in spreading of the slurry across the surface of the paper liner, which severely affects the production time required in manufacturing process; (2) blister formation in the wallboard during the manufacturing process; and (3) separation of the paper liner from the hardened gypsum core of the wallboard. All these issues arise from the inability of the slurry to spread and dry sufficiently to allow the formation of a strong bond between the slurry and the paper liner. A poor bond may furthermore cause the paper liner to lift up and away from the core leading to production delays and lost revenue. The fluidity of the gypsum slurry can be adjusted through the addition of more water, however, this negatively affects the drying time of the gypsum wallboard resulting in a reduction in line speed and revenue.

Attempts have been made to replace or eliminate the use of polyvinyl alcohol or structurally similar stabilizers to improve fluidity of the gypsum slurry. Although some have been successful in improving the fluidity of the slurry, these alternatives cause one or more other problems associated with the stability of the wax dispersion, reduced strength of the gypsum wallboard, and/or increased drying time on the production line. All of this, of course, results in to increased production cost.

There is therefore a need in the art for a wax dispersion that can impart water repellency to gypsum wallboard without compromising the fluidity or negatively affecting any other aspect of the production process of gypsum wallboard.

SUMMARY

In one aspect of the application there is provided an aqueous water repellency dispersion for use in the manufacture of gypsum wallboard comprising:
 a wax,
 a functionalized wax,
 a Kraft lignin, and
 a water soluble base in an amount sufficient to solubilize the Kraft lignin,
 wherein the amount of water soluble base is determined based on a minimum equivalent base mass ratio ($\beta$) plus sufficient base to neutralize the acid value (AV) of the functionalized wax, and
 wherein,
 when the base has a pKa≥9.4, a minimum $\beta$ is about 0.07 and
 when the base has a pKa<9.4 a minimum $\beta$ is in the range of 0.17 to greater than 0.07.

In another aspect of the application there is provided a use of a water repellency dispersion for manufacturing a gypsum wallboard wherein the aqueous water repellency dispersion comprises:
 a wax,
 a functionalized wax,
 a Kraft lignin, and
 a water soluble base in an amount sufficient to solubilize the Kraft lignin, wherein the amount of water soluble base is determined based on a minimum equivalent base mass ratio (β) plus sufficient base to neutralize the acid value (AV) of the functionalized wax, and wherein, when the base has a pKa≥9.4, a minimum β is about 0.07 and when the base has a pKa<9.4 a minimum β is in the range of 0.17 to greater than 0.07.

In another aspect of the application there is provided a method of preparing an aqueous water repellency dispersion according to claim 1 comprising:

i) preparing an aqueous phase containing the Kraft lignin and the water-soluble base;

ii) preparing a molten wax blend containing the wax and the functionalized wax;

ii) emulsifying the molten wax blend with the aqueous phase and iii) cooling to below the wax melting temperature to form the aqueous water repellency dispersion.

In yet another aspect of the application there is provided a use of an aqueous water repellency dispersion according to claim 1 in the manufacture of gypsum wallboard.

DETAILED DESCRIPTION

In accordance with the description, there is provided an aqueous water repellency dispersion, a method for preparing the aqueous water repellency dispersion and its use in the manufacture of gypsum wallboards.

As used herein, the following terms will be understood to have the following meanings.

Unless stated otherwise herein, the articles "a" or "the", when used to identify an element, are not intended to constitute a limitation of just one and will, instead, be understood to mean "at least one" or "one or more". Thus, unless stated otherwise, as used in this specification and the appended claims, the singular forms "a", "an", and "the" will be understood to include the plural form. For example, reference to "a container" will be understood to include one or more of such containers and reference to "the excipient" will be understood to include one or more of such excipients.

As used herein, the term "about" is synonymous with "approximately" and is used to provide flexibility to a numerical value or range endpoint by providing that a given value may be "a little above" or "a little below" the value stated. "About" can mean, for example, within 3 or more than 3 standard deviations. "About" can mean within a percentage range of a given value. For example, the range can be ±1%, ±5%, ±10%, ±20%, ±30%, ±40% or ±50% of a given value. "About" can mean with an order of magnitude of a given value, for example, within 2-fold, 3-fold, 4-fold, or 5-fold of a value. However, it is to be understood that even when a numerical value is accompanied by the term "about" in this specification, that express support shall be provided at least for the exact numerical value as well as though the term "about" were not present.

The term "and/or" can mean "and" or "or".

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of". Related terms such as "comprise" and "comprised" are to be interpreted in the same manner.

As used herein, "comprises," "comprising," "containing" and "having" and the like can have the meaning ascribed to them in patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with patent law.

The phrase "consisting essentially of" or "consists essentially of" will be understood as generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term, such as "comprising" or "including", it will be understood that direct support should be afforded also to "consisting essentially of" language as well as "consisting of" language as if stated explicitly and vice versa. In essence, use of one of these terms in the specification provides support for all of the others.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but to also include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but to also include individual values and sub-ranges within the indicated range. Thus, included in this numerical range are individual values such as 2, 3, and 4 and sub-ranges such as from about 1 to about 3, from about 2 to about 4, and from about 3 to about 5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

"Dispersion", as used with respect to the present description, will be understood to mean a composition comprising a liquid continuous aqueous phase and solid dispersed phase, see "IUPAC. Compendium of Chemical Terminology", 2nd ed. (the "Gold Book") compiled by A. D. McNaught and A. Wilkinson. Blackwell Scientific Publications, Oxford (1997).

"Emulsion", as used with respect to the present description, will be understood to mean a composition comprising two immiscible liquids containing a continuous aqueous phase and liquid dispersed phase; see "IUPAC. Compendium of Chemical Terminology", 2nd ed. (the "Gold Book") compiled by A. D. McNaught and A. Wilkinson. Blackwell Scientific Publications, Oxford (1997). As known in the art, the term "emulsion" may be used in the reverse, namely, to identify a liquid aqueous phase dispersed within a continuous non-aqueous phase. However, for the purposes of the present description, the invention will generally be described in terms of the former meaning.

"Lignin" as used herein refers to a "technical lignin" which comprises a complex mixture of macromolecules consisting of coniferyl (guaiacyl), synapyl (synringyl), and p-coumaryl (p-hydroxyphenyl) repeat units, extracted from lignocellulosic materials such as wood. Important physiochemical properties of lignin such as the molecular weight, ash content, hydroxyl number, and so on vary with the process used to extract lignin.

"Kraft lignin" as used herein refers to a "technical lignin" that is extracted from wood using the Kraft pulping process. In particular examples, the Kraft lignin is a purified Kraft lignin. The term "purified Kraft lignin" as used herein refers to a Kraft lignin which has been purified or extracted using the LignoBoost process (as disclosed in WO2014116150A1), or the LignoForce process (as disclosed in U.S. Pat. No. 9,091,023 B2), or other similar process. Examples of commercial sources of purified Kraft lignin include Indulin™ AT from Ingevity, Amallin LPH™ and Amallin HPH™ from West Fraser, BioChoice™ from Domtar.

The "equivalent base mass ratio" or "β" as used herein refers to the weight ratio of base and lignin of the aqueous wax dispersion. β=dry mass of base/dry mass of lignin.

"Lignosulfonate" as used herein will be understood to mean a "technical lignin" that is extracted from wood using the sulfate pulping process. Lignosulfonates are typically relatively low molecular weight and sulfonated (and thus anionic). Lignosulfonates can contain impurities, most often present in the form of sugars. Examples of commercial sources of lignosulfonates include those produced by Borregaard and Rayonier.

"Wax" as used herein will be understood to mean any known waxes that are suitable for use in manufacturing gypsum wallboard. This includes petroleum derived slack, scale, or refined paraffin waxes, synthetic waxes (such as alphaolefin wax or Fischer Tropsch wax), and natural waxes.

"Polyvinyl alcohol" or "PVA" as used herein will be understood to mean a polymer produced from the hydrolysis of polyvinyl acetate. Typically, the polyvinyl alcohol is fully hydrolyzed. Examples of commercial sources of polyvinyl alcohol include those produced by Kuraray, Sekisui Chemical Co. Ltd., or Chang Chun Group.

"Polyvinyl alcohol derivatives" as used herein will be understood to mean polymers that are produced from the hydrolysis of polyvinyl acetate copolymers. Typically, these polyvinyl alcohol derivatives contain vinyl acetate and/or ethylene comonomers. Examples of commercial sources of polyvinyl alcohol include those produced by Kuraray and Dow Chemical Corporation.

"Functionalized wax" or "oxidized wax" as used herein will be understood to mean a mostly hydrocarbon wax that contains some carboxylic acid functionality (carboxylic acid functional groups). Examples of oxidized waxes include naturally occurring crude and refined Montan wax, and synthetically produced oxidized polyethylene or oxidized polypropylene waxes.

"Olefinic succinic anhydride wax" as used herein will be understood to mean a mostly hydrocarbon wax that contains some carboxylic acid functionality. It is one example of an oxidized wax. It is the reaction product of an olefin wax and maleic anhydride. Examples of olefinic succinic anhydride wax include commercially available alkenyl succinic anhydride wax (or ASA) and EmulSurf RM.

"Stabilizer" as used herein will be understood to mean high molecular weight polymers which are typically, but not necessarily, non-ionic in nature. In the prior art a stabilizer typically refers to polyvinyl alcohol or polyvinyl alcohol derivatives. In the context of this invention a stabilizer refers to a purified Kraft lignin.

"Dispersant" as used herein will be understood to mean a low molecular weight surfactant which can be anionic, non-ionic, or cationic in nature. In the prior art a dispersant typically refers to lignosulfonates.

"Water absorption" or "WA" as used herein will be understood to mean the amount of water absorbed by a gypsum puck or gypsum wallboard under controlled conditions. The water absorption is measured gravimetrically and expressed as a percentage as compared to the dry weight of the specimen.

"Slump" or "water demand" as used herein will be understood to be a measure of the fluidity of the gypsum slurry. The slump is measured as the slurry flow distance and expressed as the distance in inches from the centre of the patty.

"Set" or "Setting time" as used herein will be understood to be a measure of the rate of drying of a gypsum slurry. The set is measured using a Gillmore Needle Apparatus and expressed as the time needed to reach sufficient hardness to withstand the pressure of the weighted needle.

"Solids" or "solids content" as used herein will be understood to refer to the amount (expressed as a weight percentage) of non-volatile material in the dispersion. More accurately, these terms refer to the total amount of non-volatile material that remains after evaporation or drying to a constant weight.

It has been found that purified Kraft lignin can be used in the preparation of aqueous wax dispersions for imparting water resistance to gypsum wallboard. The use of purified Kraft lignin results in aqueous wax dispersions that have superior properties when compared to commercially available aqueous wax dispersions. Furthermore, the purified Kraft lignin provides water resistance properties to the gypsum wall board product.

In particular, it has been found that purified Kraft lignin can be used to formulate stable aqueous wax dispersions that effectively disperse within a gypsum slurry. These aqueous wax dispersions impart water repellent properties to the gypsum wallboard, do not interfere with the gypsum dehydration process, and do not negatively affect the fluidity of the gypsum slurry. As a result, purified Kraft lignin eliminates the need for polyvinyl alcohol (PVA) or polyvinyl alcohol derivative stabilizers as well as lignosulfonate dispersants, which are commonly used in the art. It thus provides a more sustainable and more cost-effective means for dispersing wax in a gypsum slurry for the manufacturing of water resistant gypsum wallboard.

Lignin generally refers to complex polyphenolic polymers formed from coniferyl (guaiacyl), synapyl (synringyl), and p-coumaryl (p-hydroxyphenyl) repeat units. Lignin is extracted from lignocellulosic material using a variety of industrial processes, such as Kraft or soda pulping, sulphite pulping, bioethanol production, etc. Technical lignins isolated from these processes include Kraft lignin, soda lignin, lignosulfonates, organsolv lignin, etc. The technical lignin used in this invention preferentially comprises a purified form of lignin that can be solubilized in water. In a particular embodiment, the lignin is a purified form of lignin obtained from black liquor in the Kraft process.

Kraft lignin is extracted from black liquor as a by-product from the Kraft pulping process. Kraft lignin can be further processed and purified. Commercial processes have been developed for extracting and purifying Kraft lignin, generally involving acidification of the black liquor using carbon dioxide followed by a coagulation stage, filtration and washing with acid and water. The first example of such a process has been described in U.S. Pat. No. 2,464,828 by Pollak. Additional, and more recent, processes are described in WO2014 116150A1 ("LignoBoost process"), or U.S. Pat. No. 9,091,023 B2 ("LignoForce process"). The resulting Kraft lignin is of high purity and can be suspended in water to form a purified Kraft lignin suspension with a pH of 2-4.

While the term Kraft lignin may have been used indiscriminately in the prior art to refer to other products derived from a Kraft pulping process, such as, tall oil fatty acid based amidoamine blends (see for example U.S. Pat. No. 8,821,632), in the present description the term Kraft lignin is reserved for lignin obtained from a Kraft pulping process.

For the purpose of acting as an emulsifier for aqueous wax dispersions, Kraft lignin first needs to be solubilized. For example, Rojas and co-workers reported in "Lignins as Emulsion Stabilizers", Chapter 12 of Materials, Chemicals, and Energy in Forest Biomass, 2007, pg. 182-199, that dissolved Kraft and soda lignins can be used as polymeric amphiphiles for the stabilization of emulsions, but that their performance is heavily dependent on the pH. Without wishing to be bound to theory, it is believed that the solubility of Kraft lignin is controlled by the distribution of phenolic hydroxyl groups, and the pH of the medium. Kraft lignin contains a range of structurally similar guaiacyl and syringyl phenols that vary in pKa [see "pKa-values of Guaiacyl and Syringyl Phenols Related to Lignin", by Ragnar, M.; Lindgren, C. T. and Nilvebrant N.-O., J. Wood Chem. Technol. 2000, 20(3), 277-305], giving rise to an approximate pKa of lignin ranging from 9.4 to about 10.8. Dissolution of Kraft lignin, i.e. deprotonation of its acidic form, can therefore only be achieved in the presence of a sufficient quantity of a base of sufficient strength.

Bases are well known in the art and are generally understood to be compounds that can accept a proton, as described in the Brønsted-Lowry theory. A strong base is understood to be a base that fully dissociates in water. A weak base is understood to be a base that partially dissociates in water, the extent of which is described by the negative log of the acid dissociation constant pKa.

The presence of the water-soluble base raises the pH of the medium, which results in the deprotonation of the phenolic hydroxyls and, subsequently, dissolution of the purified Kraft lignin macromolecule. Suitable bases for solubilizing purified Kraft lignin include water-soluble strong bases. Other suitable bases for solubilizing purified Kraft lignin include water-soluble weak bases with a pKa of approximately 9.4 or higher. Still, other suitable bases for solubilizing purified Kraft lignin include water-soluble bases with a pKa of lower than 9.4. Various such suitable water-soluble bases would be known to one of skill in the art. The amount of base required to achieve complete solubility of the purified Kraft lignin is a function of the pKa of the base. As such, bases with a pKa of approximately 9.4 or higher are preferred, on the basis that substantially less base is required to achieve complete dissolution of the purified Kraft lignin macromolecules.

In one embodiment the bases for the invention include sodium hydroxide, potassium hydroxide and monoethanolamine. In a particular embodiment the base is potassium hydroxide.

The amount of a suitable water-soluble base required to solubilize purified Kraft lignin is expressed as the equivalent base mass ratio or β. For a particular purified Kraft lignin, the relative solubility can be expressed as a function of the equivalent base mass ratio β. For example, for a purified Kraft lignin produced by West Fraser (Amallin LPH™) and a water soluble base with a pKa of approximately 9.4 or higher such as potassium hydroxide the percentage solubility can be estimated by Equation 1:

$$\% \text{ Solubility} = [1/(0.01+0.99 \exp(-150(\beta-0.006)))] \quad \text{(Eq. 1)}$$

It then follows from Equation 1, that a minimum equivalent base mass ratio or β min of 0.07 is required to fully solubilize this purified Kraft lignin with a base with a pKa of approximately 9.4 or higher such as potassium hydroxide. More preferably, the base to lignin ratio of β≥0.10 is selected to fully solubilize this purified Kraft lignin.

As the composition and molecular structure of purified Kraft lignins is highly dependent on the wood source and extraction process, the value of β min varies depending on the type of purified Kraft lignin and base used. Suitable purified Kraft lignins include Amallin™ LPH from West Fraser, Indulin™ AT from Ingevity, and BioChoice™ from Domtar. Preferentially, these purified Kraft lignins are combined with potassium hydroxide at a β≥0.10.

The waxes that can be used in the formulation of this invention may comprise any known waxes that are suitable for use in manufacturing of gypsum wallboard. For example, the wax component of the aqueous wax dispersion may comprise any naturally occurring wax derived from petroleum, vegetable oil or animal fat, or any synthetic wax, or blends thereof. Preferentially, the aqueous wax dispersion comprises a petroleum derived wax. In particular, the petroleum derived wax comprises a refined paraffin wax. Preferred refined paraffin waxes have an oil content of <1%, low penetration, and a normal paraffin content of approximately 80% or higher as measured by gas chromatography.

The aqueous wax dispersion furthermore comprises one or more functional waxes. In particular, the functional waxes comprise predominantly hydrocarbon wax that contains some carboxylic acid functionality. These waxes are more commonly referred to as oxidized waxes. Examples of such functional waxes include oxidized synthetic waxes and maleic anhydride containing waxes. In a preferred embodiment, the aqueous wax dispersion comprises two functional waxes, selected from the groups of oxidized synthetic waxes and maleic anhydride containing waxes. In a particular example the functional wax includes at least one oxidized wax and at least one maleic anhydride containing wax. Examples of oxidized synthetic waxes include oxidized polyethylene waxes and oxidized polypropylene waxes. Preferred examples of functional waxes include emulsifiable oxidized polyethylene waxes with a melt point of approximately 105° C. or less and an acid value of approximately 20 mg KOH/g or less. Examples of maleic anhydride containing waxes comprise olefin maleic anhydride copolymers, such as those manufactured commercially by grafting maleic anhydride to polyethylene, polyolefin, or a maleic anhydride containing copolymer, as well as olefinic succinic anhydride waxes. Preferred examples of maleic anhydride containing waxes include olefinic succinic anhydride wax.

Olefin succinic anhydride wax refers to a copolymer comprising a reaction product of an olefin wax and maleic anhydride. An example of this chemistry has been disclosed in U.S. Pat. No. 4,431,826 by Sweeney. At elevated temperature, the olefin wax (an "ene") can undergo an ene-reaction with maleic anhydride (the "enophile"). The resulting olefinic succinic anhydride wax is an "ene-product", with a degree of functionalization that can be adjusted for the intended application. The olefinic succinic anhydride wax comprises the reaction product of a commercial alphaolefin wax and maleic anhydride with a degree of functionalization ranging from 0.7-0.9. The degree of functionalization refers to the number of moles of "ene" that have reacted with maleic anhydride as compared to the total moles of "ene" initially present. As a result of the high degree of functionalization, these olefin succinic anhydride waxes have acid values of approximately 80 mg KOH/g or higher.

Alternatively, one or more functional waxes can be replaced by using a Montan wax.

Some previous attempts to produce aqueous wax emulsions for use in gypsum composition have included asphalt as a component of the composition for example as a wax extender (for example U.S. Pat. No. 8,821,632). For the sake of clarity, it is noted that the aqueous wax emulsion according to the present description does not include asphalt.

The solids content of the aqueous water repellency dispersion disclosed here includes wax, functionalized wax(es), base, and the purified Kraft lignin. The purified Kraft lignin and the base are preferentially located in the aqueous continuous phase of the aqueous wax dispersion.

In one embodiment the aqueous wax dispersions of this invention is produced by emulsification of a molten wax phase with an aqueous phase containing solubilized purified Kraft lignin. The purified Kraft lignin is solubilized through the addition of a base. The molten wax phase contains refined paraffin wax and may optionally further comprise one or more functionalized waxes, or Montan wax. A coarse emulsion is formed from emulsification of the molten wax phase and the aqueous phase containing purified Kraft lignin under high shear. High shear mixing devices that may be used include a Silverson™ mixer (rotor-stator type), APV 31 MR Lab Homogenizer (homogenizer type), or a Sonolator™ (hydrodynamic cavitation type). The coarse emulsion is subsequently cooled to a temperature below the congealing point of the wax phase to form the aqueous wax dispersion.

Aqueous wax dispersions are kinetically stable, that is they demonstrate stability only for a limited period of time after which the dispersion breaks (i.e. the dispersion separates into a wax phase and an aqueous phase). The process by which an aqueous wax dispersion breaks is generally considered to be related to a change in the particle size distribution due to flocculation, resulting in creaming or sedimentation. Macroscopically, these processes are observed as stratification of the dispersion (creaming) or fallout of wax particles (sedimentation).

A stable aqueous wax dispersion is defined as a dispersion that remains free from creaming and fallout of wax particles for a period of at least 1 week. The rate of creaming can be measured using a MultiScan 20 dispersion stability analyzer from DataPhysics Instruments GmbH or other suitable instruments.

The purified Kraft lignin acts as the emulsifier or stabilizer for the wax phase of the aqueous wax dispersion. If the wax phase comprises one or more functional waxes some additional stability can be derived from the neutralization of the carboxylic acid functionality contained within those waxes. It has been found that for the purified Kraft lignin to act as an emulsifying agent for aqueous wax dispersions a complementary water-soluble base needs to be used at a $\beta$ of approximately 0.10 or higher. When one or more functional waxes are used, the amount of base in the formulation needs to be adjusted to account for the acid value (AV) of the wax phase and ensure that there is sufficient base to complete dissolution of the purified Kraft lignin. In one embodiment the amount of base is determined based on a base mass ratio of $\beta$ equal to or greater than 0.10 plus AV of the functional wax.

One considerable advantage of the use of purified Kraft lignin is that the coarse emulsion formed from emulsification of the molten wax phase and the aqueous phase containing purified Kraft lignin can be homogenized under high pressure. Contrary to coarse emulsions formed from the emulsification of the molten wax phase and the aqueous phase containing PVA or polyvinyl alcohol derivative stabilizers commonly used in the art. The presence of these stabilizers significantly increases the viscosity of the aqueous wax dispersion when homogenized under high pressure. The use of higher homogenizer pressure results in an aqueous wax dispersion with a smaller average particle size, a narrower particle size distribution, and as a result increased stability. This, in turn, provides an additional benefit in that it significantly increases the water resistance capability of the aqueous wax dispersion. Without wishing to be bound by theory, it is believed that the smaller average particle size and narrower particle size distribution allow for better distribution of the wax throughout the gypsum slurry and therefore improved surface coverage of the gypsum crystals.

The water resistance performance of aqueous wax dispersions in standard gypsum wallboard originates from the wax, functional waxes, and additives used. Typically, higher performing (i.e. high normal content) paraffin waxes are therefore used in this application. The addition of Montan and/or functional waxes adds to the water resistance performance of the aqueous wax dispersion. Other additives such as bitumen, PVA, and PVA derivatives are known to further improve the water resistance performance. Aqueous wax dispersions for gypsum wallboard known in the art typically contain an optimized ratio of paraffin wax, functional wax, and PVA.

In the instant examples, besides providing stability for the wax dispersion, the purified Kraft lignin also contributes to the water resistance performance of the gypsum wallboard. Incorporating 1 to 10 w/w % of purified Kraft lignin into the aqueous phase of the wax dispersion improves the water resistance of the gypsum wall board made with the aqueous wax dispersion. Without wishing to be bound by theory, it is believed that is a result of the ion-exchange that occurs when the aqueous wax dispersion is introduced into the gypsum slurry. During manufacture of the aqueous wax dispersion the purified Kraft lignin is neutralized in the presence of a base. The cationic counterion to the negatively charged purified Kraft lignin has to be chosen in such as way that the resulting complex is water-soluble to liberate the emulsifier characteristics of the Kraft lignin. However, once added to the gypsum slurry an ion-exchange reaction can occur where the cationic counterion is displaced with a calcium cation. The resulting complex is water-insoluble and water repellent in nature. This is similar to "soap scums" formed when fatty acid soaps are exposed to hard, calcium-rich, water.

This feature differentiates the purified Kraft lignin from other technical lignins used previously in the manufacture of water-resistant gypsum wallboard, such as lignosulfonates and chemically modified Kraft lignin. Lignosulphonates are sulfonated lignins that are permanently anionic in nature and do not form insoluble complexes in the presence of calcium ions. For example, lignosulfonates can be obtained commercially as calcium salts which are fully water-soluble. Although lignosulphonate can be used to stabilize aqueous wax dispersions for the manufacture of gypsum wallboard, there is no positive impact on the water absorption performance as observed for purified Kraft lignin.

It has been found that aqueous wax dispersions including lignin but not including a functional wax may provide suitable performance for use in manufacturing gypsum panels if the amount of aqueous wax dispersion used when manufacturing the gypsum panel is increased. Therefore, in a further embodiment the aqueous wax dispersion for use in the manufacture of a gypsum panel comprises wax, lignin and a water soluble base in a sufficient amount to solubilize the lignin.

In embodiments of the aqueous water repellency dispersion a wax phase comprising the wax and the functional wax comprises 30-45 w/w % of the total aqueous water repellency dispersion, in a further embodiment the wax comprises 33-35 w/w %. In another embodiment the kraft lignin comprises 2-10 w/w % of the total aqueous water repellency dispersion. In a further embodiment the kraft lignin comprises 4-8%. In another embodiment the wax phase contains 3-14 w/w % relative to the total amount of wax. In a further embodiment the wax phase contains 5-7 w/w % relative to the total amount of wax.

When used in the manufacture of water-resistant gypsum wallboard aqueous wax dispersions should, at a minimum, (1) provide adequate water resistance, as measured by the water absorption (WA), (2) minimally affect the gypsum crystal formation, as measured by the set time, and (3) minimally affect the fluidity of the gypsum slurry, as measured by the slump.

When compared to the prior art, the aqueous wax dispersion according to this invention provides one or more of the following advantages:
(1) Good water resistance,
(2) Comparable set time, and
(3) Better fluidity.

The improved fluidity of the gypsum slurry provides a substantial advantage for the manufacturing of gypsum wallboard as it lowers the water demand and therefore reduces drying time. It is known in the art that the use of PVA, PVA derivatives or structurally similar stabilizers has a negative effect on gypsum slurry fluidity and water demand. Attempts have, therefore, been made to replace or eliminate the use of polyvinyl alcohol or structurally similar stabilizers to improve fluidity of the gypsum slurry. Although successfully improving the fluidity of the slurry, these alternatives cause problems associated with the stability of the wax dispersion, reduced strength of the gypsum wallboard, or increased drying time on the production line. The aqueous wax dispersions of this invention effectively eliminate the existing trade-off between water absorption and process efficiency known in the art.

EXAMPLES

The present invention will be further explained and illustrated by the following comparative examples and test results. These examples are intended to describe the properties of this invention and not to limit the invention in any way.

Methods:

Shear stability was determined by shearing approximately 500 g of aqueous wax dispersion (conditioned to 25° C.) in a Silverson L4R high shear mixer equipped with a general purpose disintegrating head at 6000 rpm. The stability is measured as the time in seconds required to irreversibly destabilize the aqueous wax dispersion.

Aqueous wax dispersion stability is measured using a MultiScan 20 dispersion stability analyzer from DataPhysics Instruments GmbH. Approximately 20 mL of wax dispersion is placed within the ScanTower and incubated at 50° C. Aqueous wax dispersion stability is measured isothermally for 24 hours. The wax dispersion stability is expressed as a migration rate (mm/min) represents a measure of the rate of creaming and/or coalescence. A migration rate of less than 0.001 mm/min is considered a pass.

Gypsum pucks are prepared by the addition of the wax dispersion to water at 25° C. under gentle agitation. Slurry composition (w/w): 102.6 parts of gypsum (Plaster of Paris), 60.9 parts of water, and 0.94 parts of aqueous wax dispersion (dry-basis). Following dilution of the wax dispersion with water, the required amount of gypsum (Plaster of Paris) is added and the resulting slurry mixed for 2 minutes. Aliquots of the slurry (100 g) are poured into pre-weighted aluminum trays (d=70 mm, h=16 mm), before allowing to set at ambient conditions for 60 min. The set pucks are then removed from the trays and allowed to dry a further 120 min at 75-85° C. to +/−1 g of their target weight.

Water absorption (WA) of the gypsum pucks is measured by submerging the samples into a water bath conditioned to 25° C. The amount of absorbed water is measured gravimetrically after 120 min. An absolute WA value of approximately 5%, or less, is considered a pass. The amount of aqueous wax dispersion required to achieve a WA value of approximately 5% or less was determined based on a commercial control (Coreshield™ 800ND, Walker Emulsions Ltd.). For a slurry composition (w/w): 102.6 parts of Plaster Paris, 60.9 parts of water, and 0.94 parts of aqueous wax dispersion (dry-basis) absolute WA values typically range from 3.5-4.5%. This amount is constant in all following experiments. The WA values reported are normalized against this commercial control, where a WA value of 1 indicates equivalent performance.

Slump is measured by preparing a gypsum slurry by combining water, gypsum (Plaster of Paris), potassium hydroxide, and an aqueous wax dispersion. After a set amount of mixing time, the slurry is poured into a pipe and released to form a gypsum disc. The diameter of the disc is a measure of the slump of the gypsum slurry.

Set is measured by preparing a gypsum slurry by combining water, gypsum (Plaster of Paris), potassium hydroxide, and an aqueous wax dispersion. After a set amount of mixing time, the slurry is poured into a pipe and released to form a gypsum disc. The set is measured using a Gillmore Apparatus using a ¼ lb needle and defined as the time where the indentation of the needle does not surpass the needle head.

Lignin Sources

In one embodiment, black liquor obtained from the Kraft pulping process may be used directly as the source of lignin. However, it has been found that the use of black liquor (obtained directly from Kraft process) as the lignin source is less preferred because a) the black liquor has a low solids content requiring concentration of the material prior to its use, b) this material has a low lignin fraction and c) it contains other contaminants such as salts and sugars which have been found to destabilize the wax dispersion in use. These contaminants are also known to negatively affect water resistance performance in gypsum wallboard. In a further embodiment, purified Kraft lignin, such as Kraft lignin purified by the LignoBoost process or Force process is used.

Solubilizing Lignin

The fraction of soluble versus suspended, insoluble, purified Kraft lignin was determined by adding solid purified Kraft lignin powder to hot water at 80° C. containing a predetermined amount of a water-soluble base under vigorous agitation. The resulting mixture (20 w/w % solids) was agitated for 10 minutes, cooled, and any remaining suspended purified Kraft lignin allowed to settle under the force of gravity. The fraction of soluble purified Kraft lignin was determined from analysis of the clear aqueous layer (in duplicate).

In the presence of a strong base, such as potassium hydroxide, a minimum equivalent base mass ratio $\beta$ min is required to achieve complete lignin solubility. Here, this minimum equivalent base mass ratio was determined to be approximately $\beta$ min=0.07±0.01. This minimum equivalent base mass ratio was found to be the same for other strong bases such as sodium hydroxide and weak bases with a pKa of approximately 9.4 or higher such as monoethanolamine. In the following examples where a purified Kraft lignin is used, the amount of base (potassium hydroxide) is adjusted to achieve a $\beta$=0.11 w/w in addition to the amount of base required to neutralize the AV of the functional waxes.

Wax Dispersion Stability

Aqueous wax dispersions were prepared using the following general procedure. Two functional waxes, oxidized polyethylene wax (Epolene® E14, WestLake) and olefinic succinic anhydride wax (Walker Emulsions Inc.), are blended with a molten refined paraffin wax (1212U, The International Group Inc.). The composition of the molten wax phase is kept constant and consists of 34 w/w % of the total composition, with the functional wax comprising 6 w/w % of the wax phase. The molten wax phase is subsequently emulsified with an alkaline aqueous phase containing either no stabilizer, polyvinyl alcohol (JF-05, Japan Vam & Poval Co, Ltd.) or purified Kraft lignin (Amallin™ LPH, West Fraser). In the case of the purified Kraft lignin the amount of base (potassium hydroxide) is adjusted to achieve a $\beta$=0.11 w/w in addition to the amount of base required to neutralize the functional waxes. The alkaline aqueous phase consists of 66 w/w % of the total composition. First, the molten wax phase and aqueous phase are emulsified under high shear (Silverson™ L4R) to form a coarse emulsion. Second, the coarse emulsion is passed through a high shear homogenizer (APV 31 MR Lab Homogenizer) at <500/50 psi or 2500/250 psi to form a fine emulsion. Finally, the fine emulsion is quickly cooled to below the congealing point of the wax phase to form the final aqueous wax dispersion. The stability of these wax dispersions was assessed:

The results in Table 1 demonstrate that the use of a stabilizer is beneficial for improving the stability of the wax dispersion as it both improves creaming stability and shear resistance. However, the use of a stabilizer also results in an increase in the viscosity of the aqueous wax dispersion. The results in Table 1, furthermore, demonstrate the advantage of Kraft lignin over PVA in terms of dispersion stability. Whereas a Kraft lignin-based formulation can be homogenized at high pressure to achieve good creaming stability and shear resistance at low viscosity, the PVA based formulations are too viscous for use in the intended application. PVA/Kraft Lignin blends can be homogenized at high pressure and have good stability at somewhat elevated viscosity. Kraft lignin stabilizers can thus be used to formulate stable aqueous wax dispersions for the intended application.

Water Repellency Performance

Aqueous wax dispersions were prepared using the following general procedure. Two functional waxes, oxidized polyethylene wax (Epolene® E14, WestLake) and olefinic succinic anhydride wax (Walker Emulsions Inc.), are blended with a molten refined paraffin wax (1212U, The International Group Inc.). The composition of the molten wax phase is kept constant across and consists of 32.5 w/w % refined paraffin wax and 2.3 w/w % functional wax. The molten wax phase is subsequently emulsified with an alkaline aqueous phase containing polyvinyl alcohol (JF-05, Japan Vam & Poval Co, Ltd.) and/or purified Kraft lignin (Amallin™ LPH, West Fraser). In the case of the purified Kraft lignin the amount of base (potassium hydroxide) is adjusted to achieve a $\beta$=0.11 w/w in addition to the amount of base required to neutralize the functional waxes. First, the molten wax phase and aqueous phase are emulsified under high shear (Silverson™ L4R) to form a coarse emulsion. Second, the coarse emulsion is passed through a high shear homogenizer (APV 31 MR Lab Homogenizer) to form a fine emulsion. Finally, the fine emulsion is quickly cooled to below the congealing point of the wax phase to form the final aqueous wax dispersion.

TABLE 2

| Sample | Pressure [psi] | PVA [w/w %] | Kraft Lignin [w/w %] | pH [—] | WA [—] |
|---|---|---|---|---|---|
| A1 | <500/50 | 0.0 | 0.0 | 8.7 | 9.187 |
| A2 |  | 1.0 | 0.0 | 9.0 | 3.384 |
| A3 |  | 2.0 | 0.0 | 8.6 | 0.888 |
| C1 | <500/50 | 0.0 | 3.0 | 9.5 | 1.568 |
| C2 |  | 1.0 | 2.0 | 9.2 | 1.298 |
| C3 |  | 2.0 | 1.0 | 10.2 | 1.552 |

TABLE 1

| Stabilizer | Stabilizer [w/w %] | Pressure [psi] | Solids [%] | pH [–] | Viscosity [cP] | Creaming Stability | Shear [sec] |
|---|---|---|---|---|---|---|---|
| None | n/a | <500/50 | 34.0 | 10.0 | 7.7 | Fail | 68 |
|  | n/a | 2500/250 | 34.4 | 9.6 | 9.0 | Pass | 10 |
| PVA (JF-05) | 2.0 | <500/50 | 37.8 | 8.9 | 95 | Pass | 306 |
|  | 2.0 | 2500/250 | 36.0 | 8.3 | n/a | n/a | n/a |
| Kraft Lignin | 2.0 | <500/50 | 35.9 | 9.9 | 20 | Fail | 203 |
| (Amallin™ LPH) | 2.0 | 2500/250 | 35.9 | 10.2 | 16 | Pass | 243 |
| PVA/Kraft lignin | 2.0 | <500/50 | 36.2 | 9.5 | 43 | Fail | 374 |
|  | 2.0 | 2500/250 | 35.6 | 9.6 | 150 | Pass | >500 |
| CoreShield™ 800ND | n/a | n/a | 38.2 | 8.1 | 276 | Fail | 510 |

TABLE 2-continued

| Sample | Pressure [psi] | PVA [w/w %] | Kraft Lignin [w/w %] | pH [—] | WA [—] |
|---|---|---|---|---|---|
| D1 | 1000/100 | 0.0 | 3.0 | 9.6 | 0.873 |
| D2 | 2000/200 | 0.0 | 3.0 | 9.7 | 0.923 |
| D3 | 3000/300 | 0.0 | 3.0 | 9.7 | 0.822 |

The results of this experiment demonstrate that purified Kraft lignin can be used to achieve equivalent WA performance when compared to PVA. In the absence of both PVA and Kraft Lignin WA values are considerably above the absolute WA target of 5%. When PVA (min. 2.0%) is added to the aqueous wax dispersion, the WA values are <1 and thus below the absolute WA target of 5%. With purified Kraft lignin similar WA performance to PVA can be achieved, when the coarse emulsion is homogenized at a minimum of 1000/100 psi of pressure. Blends of PVA and purified Kraft lignin do not provide a benefit in WA as compared to purified Kraft lignin alone. It was further found that with increased homogenizer pressure the particle size distribution (PSD) both narrows and shifts to smaller sizes for the dispersions containing lignin. Additionally, it was found that the lignin based dispersion have a particle size distribution that is narrower and shifted to smaller particle sizes relative to the PVA containing dispersions.

Comparison of Technical Lignins

Aqueous wax dispersions were prepared using the following general procedure. Two functional waxes, oxidized polyethylene wax (Epolene® E14, WestLake) and olefinic succinic anhydride wax (Walker Emulsions Inc.), are blended with a molten refined paraffin wax (1212U, The International Group Inc.). The composition of the molten wax phase is kept constant across the samples and consists of 31 w/w % refined paraffin wax and 2.3 w/w % functional wax. The molten wax phase is subsequently emulsified with an alkaline aqueous phase containing 4.0 w/w % technical lignin. In the case of the purified Kraft lignins the amount of base (potassium hydroxide) is adjusted to achieve a β=0.11 w/w in addition to the amount of base required to neutralize the functional waxes. First, the molten wax phase and aqueous phase are emulsified under high shear (Silverson™ L4R) to form a coarse emulsion. Second, the coarse emulsion is passed through a high shear homogenizer (APV 31MR Lab Homogenizer) at 2500/250 psi to form a fine emulsion. Finally, the fine emulsion is quickly cooled to below the congealing point of the wax phase to form the final aqueous wax dispersion. These wax dispersions were subsequently evaluated for water absorption (WA), slump and set performance:

TABLE 3

| Lignin | Type | pH [-] | Creaming stability | WA [%/% Control] | Set [sec] | Slump [inch] |
|---|---|---|---|---|---|---|
| Amallin™ LPH (West Fraser) | purified Kraft lignin | 10.5 | Pass | 0.959 | 246 | 6.0 |
| Indulin™ AT (Ingevity) | purified Kraft lignin | 9.8 | Pass | 1.000 | 276 | 5.5 |
| BioChoice™ (Domtar) | purified Kraft lignin | 10.5 | Pass | 1.030 | 300 | 6.0 |
| Lineo™ Classic (Stora Enso) | purified Kraft lignin | 10.2 | Pass | 1.721 | 308 | 6.25 |
| Indulin™ NG-SS | modified Kraft lignin | 9.0 | Pass | 7.21 | dns | 2.5 |
| Ultrazine NA (Borregaard) | purified lignosulfonate | 8.8 | Pass | 2.808 | dns | 6.25 |
| Norlig 42C (LignoTech USA) | lignosulfonate | 7.9 | Pass | 9.45 | dns | 6.0 |

Note:
"dns" stands for "did not set"; the set time for these gypsum slurries could not be measured.

The results of this experiment demonstrate that a clear distinction can be made between purified Kraft lignins obtained from Kraft pulping (i.e. Amallin™ LPH, BioChoice™, and Indulin™ AT) versus other technical lignins obtained from either sulfite pulping (i.e. Ultrazine NA and Norlig 42C) or chemical modification of a purified Kraft lignin (i.e. Indulin NG-SS). Although any technical lignin can be used to formulate a stable aqueous wax dispersion, only the use of purified Kraft lignin results acceptable WA performance. Furthermore, significant issues are observed in terms of slump and set for technical lignins obtained from either sulfite pulping (i.e. Ultrazine NA and Norlig 42C) or chemical modification of a purified Kraft lignin (i.e. Indulin NG-SS). Most notably, the set time for the gypsum slurries prepared with aqueous wax dispersions containing these technical lignins could not be determined. Clearly distinguishing the performance of the purified Kraft lignins from other technical lignins used in aqueous wax dispersions for gypsum wallboard.

Purified Kraft Lignin

Aqueous wax dispersions were prepared using the following general procedure. A wax phase containing a molten refined paraffin wax (1212U, The International Group Inc.) and, optionally, two functional waxes, oxidized polyethylene wax (Epolene® E14, WestLake) and olefinic succinic anhydride wax (Walker Emulsions Inc.) is prepared. The molten wax phase is subsequently emulsified with an alkaline aqueous phase containing a predetermined amount of purified Kraft lignin and sufficient base (potassium hydroxide) achieve a β=0.11 w/w in addition to the amount of base required to neutralize the functional waxes. The theoretical solids content of these aqueous wax dispersions is 38 w/w % and includes the refined paraffin wax, functional waxes (if used), purified Kraft lignin, and potassium hydroxide. First, the molten wax phase and aqueous phase are emulsified under high shear (Silverson™ L4R) to form a coarse emulsion. Second, the coarse emulsion is passed through a high shear homogenizer (APV 31MR Lab Homogenizer) at 2500/250 psi to form a fine emulsion. Finally, the fine emulsion is quickly cooled to below the congealing point of the wax phase to form the final aqueous wax dispersion.

TABLE 4

| Lignin | Lignin [%] | Functional Wax [%] | pH [—] | WA [%] |
|---|---|---|---|---|
| Amallin™ LPH (West Fraser) | 3.0 | 2.3 | 10.5 | 1.298 |
| | 4.0 | 2.3 | 10.0 | 0.959 |
| | 5.0 | 2.3 | 9.8 | 0.660 |
| | 4.0 | 0.0 | 11.2 | 11.59 |
| | 6.0 | 0.0 | 10.8 | 3.55 |

TABLE 4-continued

| Lignin | Lignin [%] | Functional Wax [%] | pH [—] | WA [%] |
|---|---|---|---|---|
| | 8.0 | 0.0 | 10.6 | 2.11 |
| | 10.0 | 0.0 | 10.5 | 1.31 |
| BioChoice ™ | 4.0 | 2.3 | 10.5 | 1.030 |
| (Domtar) | 10.0 | 0.0 | 10.6 | 1.92 |

The results of this experiment demonstrate that purified Kraft lignin can not only replace PVA, but also the functional waxes used in commercial aqueous wax dispersions. The formulations containing 10 w/w % Amallin LPH or BioChoice are close to the absolute WA value of 5%.

Gypsum Wallboard

Two aqueous wax dispersions from this invention were compared against two commercial references. The aqueous wax dispersion from this invention contains either functional wax and purified Kraft lignin (Sample A) or purified Kraft lignin only (Sample B). The commercial references are one undisclosed product and Coreshield™ 800ND from Walker Emulsions Ltd. The fluidity was measured by determining the water-to-stucco ratio (WSR) to achieve a 7.5" gypsum patty at 1.5% dosage. Set was measured as the time required to achieve 98% hydration of the stucco in a temperature rise set calorimeter. Compressive strength (CS) was measured on 2" cubes according to ASTM C472. Water absorption (WA) was measured for laboratory gypsum wallboard samples with a target weight of 1700+/−100 lbs/msf.

TABLE 6

| Sample | Stabilizer | Stabilizer [%] | WSR [−] | Set [min] | CS [psi] | WA [%] |
|---|---|---|---|---|---|---|
| Commercial Reference | PVA | Unknown | 55 | 44.8 | 2839 | 4.2 |
| Coreshield™ 800ND | | | 66 | 44.7 | 2857 | ntd |
| Sample A | purified | 4.0 | 54 | 47.9 | 3052 | 4.7 |
| Sample B | Kraft lignin | 10.0 | 53 | 40.4 | 3179 | 9.5 |

The results of this experiment demonstrate that Samples A and B are comparable to commercial aqueous wax dispersions used for the production of gypsum wallboard.

Comparative Example Purified Kraft Lignin Vs Chemically Modified Kraft Lignin

While the U.S. Pat. No. 8,821,632 B2 by Stuart et al. teaches the optional use of a "Kraft lignin", Table 1 of that patent lists Indulin™ ISE as the lignin, which is a complex reaction product specifically formulated for anionic, slow-setting, asphalt emulsions. Indulin™ ISE is no longer commercially available, and has been replaced by Indulin™ NG-SS, a complex reaction product specifically formulated for anionic, slow-setting, asphalt emulsions. Although Indulin™ ISE is described as a "Kraft lignin" in the prior art, the technical data sheet of Indulin™ ISE suggests that this is a chemically modified Kraft lignin and therefore structurally different from the purified Kraft lignins used in the present emulsions. A comparison study of aqueous wax dispersions prepared from the chemically modified lignin, Indulin™ NG-SS and the purified Kraft lignin, Amallin™ LPH was undertaken. The results of this study are shown in Table 7.

TABLE 7

| Lignin | Stabilizer | Stabilizer [%] | pH [−] | WA [−] | Set [sec] | Slump [−] |
|---|---|---|---|---|---|---|
| Amallin™ LPH | Kraft lignin | 4.0 | 10.5 | 0.959 | 246 | 6.0 |
| Indulin™ NG-SS | Modified Kraft lignin | 4.0 | 9.0 | 7.21 | dns | 2.5 |

Note: "dns" stands for "did not set"; the set time for this gypsum slurry could not be measured.

The results of this experiments show that the chemically modified Kraft lignin similar to the one described in U.S. Pat. No. 8,821,632 B2 does not provide aqueous wax dispersions having the same properties as dispersion prepared with purified Kraft lignin. Therefore, the modified Kraft lignin described in U.S. Pat. No. 8,821,632 B2 cannot be considered equivalent to the purified Kraft lignins described herein.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to limit the invention in any way. The disclosures of all prior art recited herein are incorporated herein by reference in their entirety.

We claim:

1. An aqueous water repellency dispersion for use in the manufacture of gypsum wallboard comprising:
    a wax,
    a functionalized wax having an acid value, AV,
    a Kraft lignin, and
    a water soluble base,
    wherein the water soluble base is present in the dispersion in an amount sufficient to (i) solubilize the Kraft lignin and (ii) neutralize the acid value (AV) of the functionalized wax,
    and wherein:
    the wax and the functionalized wax comprise a wax phase that is 30 to 45 w/w % of the total aqueous water repellency dispersion; and
    the wax phase contains 3-14 w/w % functionalized wax relative to the total amount of wax.

2. The aqueous water repellency dispersion for use according to claim 1 wherein the Kraft lignin is a purified Kraft lignin.

3. The aqueous water repellency dispersion for use according to claim 2 wherein the purified Kraft lignin is Kraft lignin which has been formed using a LignoBoost process or a LignoForce process, or other similar purification process.

4. The aqueous water repellency dispersion for use according to claim 2 wherein the amount of the water soluble base sufficient to solubilize the Kraft lignin is determined according to an equivalent base mass ratio β, wherein β is the weight ratio of the base to the Kraft lignin, and wherein:
    β is at least about 0.07 when the base has a pKa≥9.4;
    β is at least in the range of greater than 0.07 to 0.17 when the base has a pKa<9.4; or,
    β is greater than or equal to 0.10.

5. The aqueous water repellency dispersion for use according to claim 1 wherein the water soluble base is potassium hydroxide.

6. The aqueous water repellency dispersion for use according to claim 1 wherein, the wax is one or more of a naturally occurring wax derived from petroleum, vegetable oil, animal fat, or synthetic wax.

7. The aqueous water repellency dispersion for use according to claim 1 wherein the wax is paraffin wax or synthetic wax.

8. The aqueous water repellency dispersion for use according to claim 7 wherein the synthetic wax is alphaolefin wax, Fischer Tropsch wax, or a blend thereof.

9. The aqueous water repellency dispersion for use according to claim 1 wherein the functionalized wax is a hydrocarbon wax that contains carboxylic acid functionality.

10. The aqueous water repellency dispersion for use according to claim 1 wherein the functionalized wax is an oxidized synthetic wax, a maleic anhydride containing wax, Carnauba wax, Montan wax or a mixture thereof.

11. The aqueous water repellency dispersion for use according to claim 1 wherein the functionalized wax comprises two or more types of waxes, wherein at least one is an oxidized synthetic wax or a maleic anhydride containing wax, and the other is an oxidized synthetic wax, a maleic anhydride containing wax or a Montan wax.

12. The aqueous water repellency dispersion for use according to claim 1 wherein the functionalized wax is a blend of oxidized polyethylene wax and olefinic succinic anhydride wax.

13. The aqueous water repellency dispersion for use according to claim 1 wherein the wax phase is 32-35 w/w % of the total aqueous water repellency dispersion.

14. The aqueous water repellency dispersion according to claim 1 wherein the wax phase contains 5-7 w/w % functionalized wax relative to the total amount of wax.

15. The aqueous water repellency dispersion according to claim 1 wherein the Kraft lignin is 2-10 w/w % of the total aqueous water repellency dispersion.

16. The aqueous water repellency dispersion according to claim 1 wherein the Kraft lignin is 4-8 w/w % of the total aqueous water repellency dispersion.

17. A method of preparing an aqueous water repellency dispersion according to claim 1 comprising:
  i) preparing an aqueous phase containing the Kraft lignin and the water-soluble base;
  ii) preparing a molten wax blend containing the wax and the functionalized wax;
  iii) emulsifying the molten wax blend with the aqueous phase and
  iv) cooling to below a wax melting temperature to form the aqueous water repellency dispersion having the composition as set forth in claim 1.

18. The method according to claim 17 wherein the emulsifying step comprises, first, emulsifying under high shear to form a coarse emulsion and second, passing the coarse emulsion through a high shear homogenizer to form a fine emulsion.

* * * * *